United States Patent

Lepitre et al.

[11] Patent Number: 5,914,993
[45] Date of Patent: Jun. 22, 1999

[54] MULTIRATE TRANSMISSION SYSTEM

[75] Inventors: Didier Lepitre; Caroline Gonnet, both of Paris, France

[73] Assignee: U.S. Philips Corporation, New York, N.Y.

[21] Appl. No.: 08/611,705

[22] Filed: Mar. 6, 1996

[30] Foreign Application Priority Data

Mar. 8, 1995 [FR] France ................... 95 02711

[51] Int. Cl.$^6$ .................................................. H04L 23/00

[52] U.S. Cl. ........................................... 375/377; 370/465

[58] Field of Search ................... 375/219, 222, 375/225, 377; 370/465; 341/61

[56] References Cited

U.S. PATENT DOCUMENTS 4,633,411  12/1986  Bliss ........................................ 364/481

FOREIGN PATENT DOCUMENTS 0643507  3/1995  European Pat. Off. .......... H04L 1/12

Primary Examiner—Chi H. Pham
Assistant Examiner—Bryan Webster
Attorney, Agent, or Firm—Venable

[57] ABSTRACT

A transmission system for transmission between end devices (1) and (2) is provided for transmitting information signals at a certain common bit rate. This bit rate depends on a symbol rate and a carrier frequency. Via a processing by a processor (9) which cooperates with an instruction memory (10), the largest possible bit rate is determined for exchanging information signals between end devices.

4 Claims, 2 Drawing Sheets

MULTIRATE TRANSMISSION SYSTEM

TECHNICAL FIELD

The present invention relates to a transmission system comprising at least two end devices which are connected by a transmission medium for transmitting between them information signals at a symbol rate according to at least a symbol rate and at least a carrier frequency, which system comprises transmission medium analysis means for analyzing the transmission quality of said medium and to modems suitable for use in such a system.

BACKGROUND OF THE INVENTION

Current transmission tendencies are to utilize ever higher transmission rates. However, these rates are not always ensured, for the transmission mediums are subjected to disturbance degrading this transmission and often lower rates which are less sensitive to disturbance have to be selected.

Therefore, the problem occurs of adapting the transmission rate between two modems (a local modem and a remote modem) as a function of the quality of the line and through-put capacity of the modems. This is described in European Patent Application No. 0 643 507 filed Sep. 6, 1994. Although the known system gives entire satisfaction, it is no longer adapted to the new standards that are applied to the modems; one may recollect specifically V.34 standard of CCITT which proposes for certain rates multiple combinations of carrier frequencies and symbol rates.

SUMMARY OF THE INVENTION

For resolving these problems, a transmission system as described in the opening paragraph is characterized in that it comprises:

rate-defining means for producing a first series of information signals which define for each of the end devices a plurality of rates which are compatible with the transmission quality as a function of a symbol rate and a carrier frequency, first selection means for selecting the combinations of baud rate and carrier frequency for which the value (dmax) produced by the rate-defining means is maximum, first exchanging means between the two end devices for exchanging the combinations produced by the first selection means, second selection means for selecting a baud rate of a certain combination pair from combination pairs formed by the local and exchanged combinations, third selection means for selecting a first rate and a second rate based upon the first combination pair, fourth selection means for determining a third rate (dcom) based upon the first and second rates.

These and other aspects of the invention will be apparent from and elucidated with reference to the embodiments described hereinafter.

DETAILED DESCRIPTION

Figure 1:
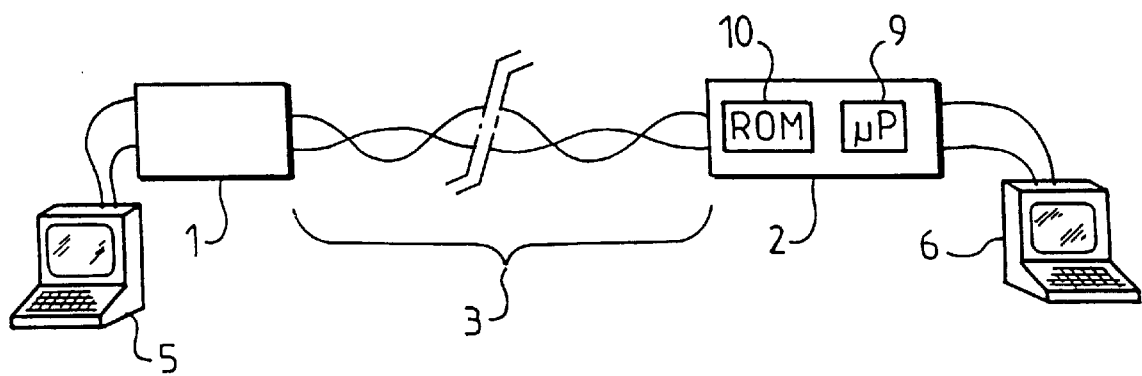
FIG. 1 shows a transmission system according to the invention.

The system shown in FIG. 1 is formed by two modems 1 and 2 which are connected to a telephone line 3. These modems enable two terminals 5 and 6 to exchange data. Within the scope of the described example, reference be made to said V.34 standard. According to this standard there are various symbol rates with the associated carrier frequencies which are given in the Table I hereinbelow.

TABLE I

| symbol rate | low frequency | high frequency |
| --- | --- | --- |
| 2490 | 1600 | 1800 |
| 2743 | 1646 | 1829 |
| 2800 | 1680 | 1867 |
| 3000 | 1800 | 2000 |
| 3200 | 1829 | 1920 |
| 3429 | 1959 | 1959 |

At various symbol rates there may be a plurality of transmission rates given in TABLE II hereinbelow.

TABLE II

| rate | SYMBOL Signaling rates | | | | | |
| --- | --- | --- | --- | --- | --- | --- |
| ↓ | 2400 | 2743 | 2800 | 3000 | 3200 | 3429 |
| 2400 | x | | | | | |
| 4800 | x | x | x | x | x | x |
| 7200 | x | x | x | x | x | x |
| 9600 | x | x | x | x | x | x |
| 12000 | x | x | x | x | x | x |
| 14400 | x | x | x | x | x | x |
| 16800 | x | x | x | x | x | x |
| 19200 | x | x | x | x | x | x |
| 21600 | x | x | x | x | x | x |
| 24000 | | x | x | x | x | x |
| 26400 | | | | x | x | x |
| 28800 | | | | | x | x |
| 32000 | | | | | | x |

The crosses in above Table indicate the symbol rates associated with the signaling rates.

There are thus various combinations which yield the same rate. One thus seeks to satisfy the following constraints:

the selected transmission rate must be maximum, the selected transmission rate must belong to a rate fork imposed by the user, the transmission rates are identical in the two directions of transmission, the selected transmission rate must ensure operation with minimum errors.

The means for satisfying these constraints are formed by a process used by a processor 9 for the modem 2 and defined by the control codes of this processor, for example in a read-only memory 10. The modem may have a similar structure to that of modem 2.

Figure 2:
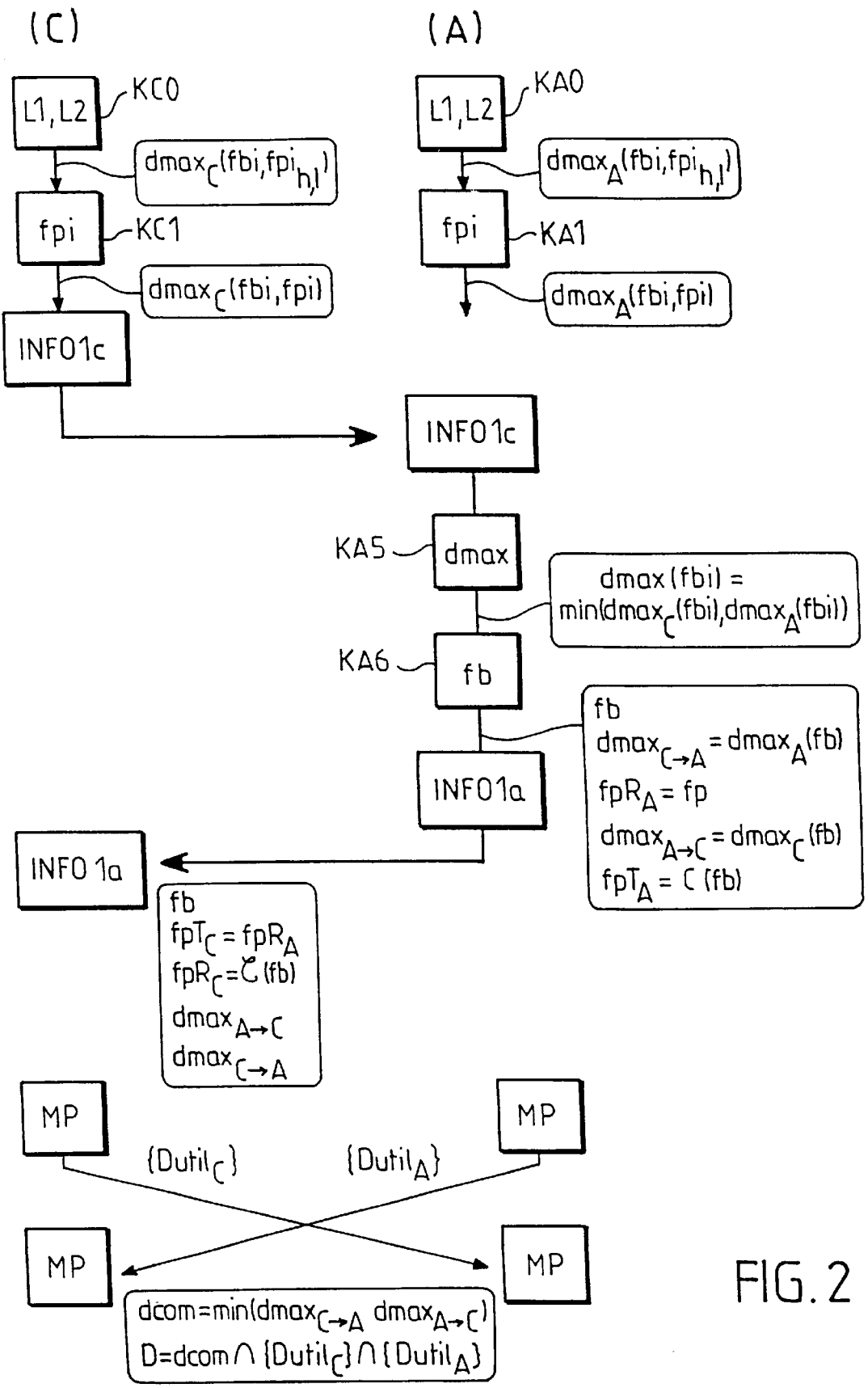
FIG. 2 shows an operational block diagram of a system according to the invention.

Now reference will be made to FIG. 2 which shows the various functions of this process. A distinction is made between the calling modem (C) and the called modem (A).

FIRST STEP

For implementing the invention, the test sequence is used which, based upon the signal sequences L1 and L2 (see V.34 standard) allows a determination of the transfer function of the line that connects the modems 1 and 2 and the signal-to-noise ratios of this line. From this transfer function is determined for each combination of symbol rate/carrier frequency a maximum transmission rate that refers to the line. U.S. Pat. No. 4,633,411 provides all the precise information relating to the analysis of the transmission lines.

At the output of the boxes KC0 and KA0, for each modem that has received the signal sequences L1 and L2, there is a list of maximum transmission rates $dmax_C$ and $dmax_A$, as a function of the baud rate ($fb_i$) and the high or low carrier frequency ($fpi_h$ or $fpi_l$), that is to say, for each of the modems:

|     |           |                |
| --- | --------- | -------------- |
|     | $dmax_C$  | (fb0, fp0$_l$) |
|     | $dmax_C$  | (fb0, fp0$_h$) |
|     | $dmax_C$  | (fb1, fp1$_l$) |
|     | $dmax_C$  | (fb1, fp1$_h$) |
|     | ...       | ...            |
|     | $dmax_C$  | (fbn, fpn$_h$) |
| and |           |                |
|     | $dmax_A$  | (fb0, fp0$_l$) |
|     | $dmax_A$  | (fb0, fp0$_h$) |
|     | $dmax_A$  | (fb1, fp1$_l$) |
|     | $dmax_A$  | (fb1, fp1$_h$) |
|     | ...       | ...            |
|     | $dmax_A$  | (fbn, fpn$_h$) |

From this first list of rates are retained those rates whose carrier frequencies are associated to the highest rates by implementing the following method:

$$\text{If} \quad dmax(fbi, fpi_h) \geq dmax(fbi, fpi_l)$$
$$\text{then:} \quad dmax_X = dmax(fbi, fpi_h)$$
$$fpi = fpi_h$$
$$\text{if not:} \quad dmax_X = dmax(fbi, fpi_l)$$
$$fpi = fpi_l$$

with $0 \leq i \leq 5$.

The index X represents C or A, depending on whether the calling or called modem is considered. This second list is obtained at the end of boxes KC1 and KA1.

a) Case of the calling modem

The calling modem is to process the information block INFO1c. Then, among the 109 bits of this block INFO1c represented by b0 to b108 and being based on the second list, the following insertions will be made:

$$b25 = fp0$$
$$b30...33 = dmax_C(fb0, fp0)$$
$$b34 = fp1$$
$$b39...42 = dmax_C ...$$
$$...$$
$$b70 = fp5$$
$$b75...78 = dmax_C(fb5, fp5).$$

The modem also receives the 70 bits b'0 to b'69 of the block which is formed by information signals INFO1a processed by the called modem and which is transmitted by the latter. The bits b'34 . . . 36 of this block indicate the symbol rate fb, the transmission carrier frequency fpT given by bit b'25 is the receiving frequency $fpR_A$ of the called modem. A combination C to be defined hereinafter determines the receiving frequency $fpR_C$ of the calling modem and also two maximum rates $dmax_{A \to C}$ and $dmax_{C \to A}$ for the two directions of transmission.

b) Case of the Called Modem

The various information signals $dmax_C$ (fbi, fpi) transmitted in the block INFO1c from the calling modem are combined with those $dmax_A$(fbi,fpi) processed by the called modem. The called modem seeks for each baud rate the minimum of the maximum rates in the two directions (box KA5):

$$dmax(fbi) = \min\{dmax_C(fbi, fpi_C), dmax_A(fbi, fpi_A)\}$$

Then, by the operation indicated in box KA6, the baud rate is determined which corresponds to the largest dmax(fbi), that is, $dmax_{C \to A}$. If there are various baud rates that give the same values $dmax(fb_i)$, the highest baud rate is selected, that is, fb times this rate, and the combination C(fb,$fpi_A$,$fpi_C$) that produces the value fb for the retained value dmax.

However, there are two restrictions to this processing:

1. If, for all the baud rates, the maximum rate is the minimum rate that can be used for each symbol rate under consideration, the selected baud rate is the lowest with, preferably, the high frequency carrier, 2. If the user selects 2400 bits/s as his single transmission rate, the symbol rate is forced to be 2400 Hz with a high frequency carrier, whatever the result of the other tests.

The receiving carrier frequency $fpR_A$ of the called modem is the frequency $fpi_A$ of said combination C.

The transmitting carrier frequency $fpT_A$ is the frequency $fpi_C$ of said combination C.

The rate $dmax_{A \to C}$ is given by $dmax_c(fb,fpi_c)$.

Block INFO1A is constructed in the following manner:

b'25 = $fpR_A$ b'30 . . . 33 = $dmax_{C \to A}$ b'34 . . . 36 = fb b'37 . . . 39 = $dmax_{A \to C}$ SECOND STEP (fourth phase of the synchronization process)

At the end of the second phase, each modem has the following information signals:

$$A \begin{cases} fb \\ fpi_A \\ dmax_{C \to A} \\ dmax_{A \to C} \end{cases} \quad B \begin{cases} fb \\ fpi_C \\ dmax_{A \to C} \\ dmax_{C \to A} \end{cases}$$

Each of these modems thus has the symbol rate, a suitable carrier and the maximum rate. The users of each of the modems can decide on the rates they wish to use. Let $\{Dutil_C\}$ be the set of rates the user of the calling modem wishes to use and $\{Dutil_A\}$ the set of rates the user of the called modem wishes to use. These rates are transmitted in blocks MP by the bits b"35 . . . 39 of this block formed by 188 bits. The rate $dmax_{C \to A}$ is also transmitted by the bits b"20 . . . 23 and the rate $dmax_{A \to C}$ by the bits b"24 . . . 27. If these rates $dmax_{C \to A}$ and $dmax_{A \to C}$ are lower than the minimum rate recommended by the user, the latter value is forced upon these rates:

if $dmax_{C \to A}$ < min $\{Dutil_X\}$
then $dmax_{C \to A}$ = min $\{Dutil_X\}$
and
if $dmax_{A \to C}$ < min $\{Dutil_X\}$
then $dmax_{A \to C}$ = min $\{Dutil_X\}$ Index X represents A or C depending on whether the calling or called modem is considered. Based on these received blocks, the called and calling modems perform the same calculations.

First the maximum common rate $d_{com}$ is determined:

$$d_{com} = \min[(dmax_{C \to A}, dmax_{A \to C})].$$

If $d_{com}$ is smaller than the minimum rate recommended by the user of the remote modem Y, the latter value is forced upon this rate:

if $d_{com} < \min \{Dutil_Y\}$ then $d\text{com} = \min \{Dutil_Y\}$

Index Y represents the remote modem (C or A).

Then the highest possible rate that can be used between the two modems is determined:

$$D = d_{com} \cap \{Dutil_C\} \cap \{Dutil_A\}$$

If this intersection is empty, the modems do not connect. If D=2400 bits/s and this rate is not supported by the selected combination (baud rate/carrier frequency), the modems are resynchronized with forced parameters:

D=2400 bits/s

Baud rate=2400 Hz

Carrier frequency (high frequency)=1800 Hz.

We claim:

1. A transmission system comprising at least two end devices which are connected by a transmission medium for transmitting between them information signals at a bit rate according to at least a symbol rate and at least a carrier frequency, which system comprises transmission medium analysis means for analyzing the transmission quality of said medium, which system is characterized in that it comprises:

rate-defining means for producing a first series of information signals which define for each of the end devices a plurality of rates which are compatible with the transmission quality as a function of a baud rate and a carrier frequency, first selection means for selecting a plurality of local combination pairs of symbol rate and carrier frequency at each end device for which the value (dmax) produced by the rate-defining means is maximum, first exchanging means between the two end devices for exchanging said local combination pairs produced by the first selection means, second selection means for selecting a symbol rate of one of said combination pairs formed by the local and exchanged combinations, third selection means for selecting a first rate and a second rate based upon said combination pair selected by said second selection means, and fourth selection means for determining a third rate (dcom) based upon the first and second rates.

2. The invention as claimed in claim 1, characterized in that it further includes:

second exchanging means for exchanging user rates between said end devices, and fifth selection means for determining a fourth rate.

3. The invention as defined in claim 1 wherein at least one of said end devices is a modem.

4. The invention as claimed in claim 3, characterized in that the modem is compatible with the V0.34 standard.

* * * * *